No. 882,985. PATENTED MAR. 24, 1908.
W. W. WILSON.
POULTRY GREASER.
APPLICATION FILED JUNE 22, 1907.
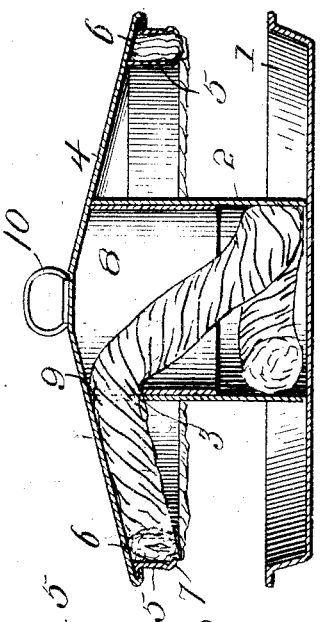
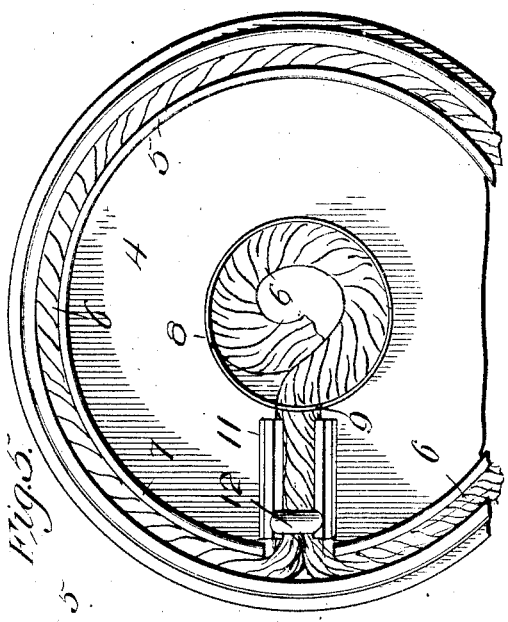
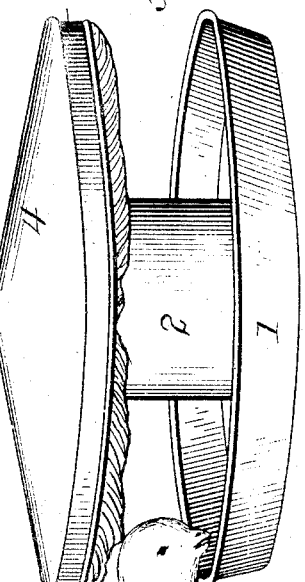
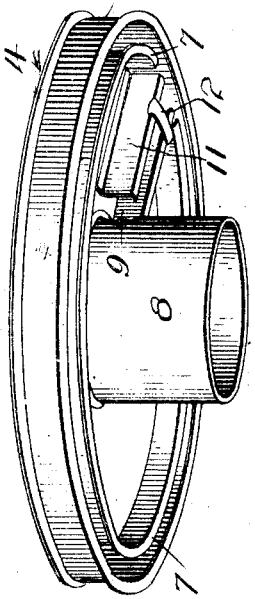
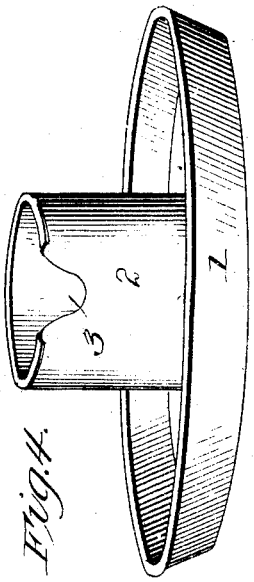
WITNESSES:
INVENTOR
William W. Wilson.
BY
Attorney

UNITED STATES PATENT OFFICE.

WILLIAM W. WILSON, OF DALLAS, TEXAS.

POULTRY-GREASER.

No. 882,985.  Specification of Letters Patent.  Patented March 24, 1908.

Application filed June 22, 1907. Serial No. 380,320.

*To all whom it may concern:*

Be it known that I, WILLIAM W. WILSON, citizen of the United States, residing at Dallas, county of Dallas, and State of Texas, have invented certain new and useful Improvements in Poultry-Greasers, of which the following is a specification, reference being had therein to the accompanying drawing.

This invention relates to a poultry greaser, and particularly to a structure in which an insecticide may be applied from an absorbent surface to the fowl when the latter is eating from a feed pan.

The invention has for an object to provide a novel and improved construction of parts in which the feed pan is formed with a centrally disposed reservoir, and a cover with an annular wick holder disposed above the edge of the pan and communicating with said reservoir.

Other and further objects and advantages of the invention will be hereinafter set forth and the novel features thereof defined by the appended claims.

In the drawing:—Figure 1 is a perspective of the invention; Fig. 2 is a vertical section thereof; Fig. 3 is a detail perspective of the cover with the wick removed; Fig. 4 is a similar view of the pan, and Fig. 5 is a bottom plan of the cover with the wick in position and parts broken away.

Like numerals refer to like parts in the several views of the drawing.

The numeral 1 designates a feed pan which may be of any desired size or configuration, and is provided with the centrally disposed tank 2 adapted to receive oil or any other desired insecticide to be applied to the chickens or other fowls in using the pan. The upper portion of this tank is cut away as at 3 to permit the wick to enter the same. The cover 4 is of equal diameter to the pan and provided on its under surface at its outer periphery with the wick holder 5 to receive and retain a body of absorbent material, preferably a wick 6 capable of conveying liquid by capillary attraction from the tank to the holder. This wick extends below the lower portion of the holder and is retained therein by the inturned edges 7 thereof. The holder is provided centrally with a wick casing 8 secured thereto and having an opening 9 at one side, said casing being adapted to fit tightly within the tank so that all of the parts may be lifted by the ring or handle 10 at the top of the cover. Leading from the annular holder 5 to this opening 9 is a radially disposed holder 11 the walls of which are held against expansion by the cross piece 12 and through this radial holder both ends of the wick are passed and enter the casing 8. The wick or absorbent material thus extends entirely around the holder and each end thereof is returned to the tank, as shown in Fig. 5.

In the use of the invention it will be seen that the chickens or other fowls in approaching the feed pan have the use of the entire periphery thereof, and their backs are brought directly in contact with the absorbent material carried by the cover, while this cover is capable of immediate removal and carries all of the wick therewith so that the tank may be filled with oil or other insecticide which it is desired to apply to the fowls to kill insects or other vermin thereon. The use of such an insecticide prevents bites from mosquitoes which in the case of young fowls causes the eyes to swell and close.

The invention is one of simple construction comprising two separable parts and forms a pan capable of feeding about the entire periphery and the tank is disposed at a point to which the fowls do not ordinarily reach in feeding. By returning both ends of the wick to the reservoir dripping is prevented and a continuous capillary feed established as the oil is used therefrom.

Having described my invention and set forth its merits, what I claim and desire to secure by Letters Patent is:—

1. A poultry greaser comprising a feed pan having a centrally disposed tank therein, a cover supported upon said tank, and an absorbent body carried by said cover above the edges of said pan.

2. A poultry greaser comprising a feed pan having a centrally disposed tank therein, a cover supported upon said tank, a wick holder extending about the edges of said cover, and a wick disposed in said holder and communicating with said tank.

3. A poultry greaser comprising a feed pan having a centrally disposed tank therein, a cover provided with a wick casing adapted to enter said tank, a peripheral wick holder upon the under face of said cover, and an absorbent wicking carried by said holder and extending into said casing.

4. A poultry greaser comprising a feed pan having a centrally disposed tank therein, a cover provided with a wick casing adapted to enter said tank, a peripheral wick holder upon the under face of said cover, an absorbent wicking carried by said holder and extending into said casing, and a radially disposed holder extending from the peripheral holder to an opening in said casing.

5. In a poultry greaser, a pan, a centrally disposed tank therein cut away at its upper portion, a cover supported on said tank, an annular wick holder carried by said cover above the edges of said pan, and an absorbent wick in said holder having its opposite ends extended to said tank.

6. In a poultry greaser, a pan, a centrally disposed tank therein cut away at its upper portion, a cover supported on said tank, an annular wick holder carried by said cover above the edges of said pan, an absorbent wick in said holder having its opposite ends extended to said tank, a wick casing disposed centrally of the cover to enter said tank and provided with an apertured wall, and a radially disposed holder extending from said aperture to the annular holder.

7. In a poultry greaser, a feed pan, a tank, a cover supported over said pan, a wick holder carried by said cover above the edges of said pan and a conducting wick extended from the tank to said holder.

8. In a poultry greaser, a feed pan, a tank, a cover supported over said pan, a wick holder carried by said cover above the edges of said pan, inturned edges at the lower portion of said holder to retain the wick therein and a conducting wick extended from the tank to said holder.

In testimony whereof I affix my signature in presence of two witnesses.

WILLIAM W. WILSON.

Witnesses:
SAM W. LONG,
ROBERT S. LONG.